United States Patent
Hooper et al.

(10) Patent No.: US 6,511,646 B1
(45) Date of Patent: Jan. 28, 2003

(54) TREATMENT OF IRON CHLORIDE FROM CHLORINATION DUST

(75) Inventors: Barry Neil Hooper, Cheltenham (AU); Martin Hirsch, Friedrichsdorf (DE); Andreas Orth, Friedrichsdorf (DE); Brian Bennett, Stockton-on-Tees (GB); John Frank Davidson, Cambridge (GB); Martin Conduit, Warrington (DE); Neil Fallon, Stocton-on-Tees (GB); Peter John Davidson, Bussum (NL)

(73) Assignee: Tioxide Group Services Limited, London (GB)

(*) Notice: Subject to any disclaimer, the term of this patent is extended or adjusted under 35 U.S.C. 154(b) by 0 days.

(21) Appl. No.: 09/601,869
(22) PCT Filed: Feb. 11, 1999
(86) PCT No.: PCT/GB99/00247
§ 371 (c)(1),
(2), (4) Date: Jan. 12, 2001
(87) PCT Pub. No.: WO99/41189
PCT Pub. Date: Aug. 19, 1999

(30) Foreign Application Priority Data

Feb. 13, 1998 (GB) .............................................. 9803018

(51) Int. Cl.⁷ .............................. C01B 7/03; C01G 49/06
(52) U.S. Cl. ...................... 423/500; 423/633; 423/493; 423/148
(58) Field of Search .............................. 423/500, 502, 423/493, 632, 633, 634, 148

(56) References Cited

U.S. PATENT DOCUMENTS

| 3,865,920 | A | * | 2/1975 | Dunn, Jr. ..................... 423/148 |
| 4,055,621 | A | * | 10/1977 | Okudaira et al. ........... 423/148 |
| 4,060,584 | A | * | 11/1977 | Hartmann et al. .......... 423/149 |
| 4,144,316 | A | * | 3/1979 | Haack et al. ................ 423/502 |
| 4,216,196 | A | * | 8/1980 | Hohmann .................... 423/481 |
| 4,244,929 | A | * | 1/1981 | Lumsden et al. ........... 423/148 |
| 4,994,255 | A | * | 2/1991 | Hsu ............................. 423/148 |

* cited by examiner

Primary Examiner—Ngoc-Yen Nguyen
(74) Attorney, Agent, or Firm—Russ R. Stolle; Ron D. Brown; Christopher J. Whewell

(57) ABSTRACT

A process for producing chlorine and iron oxide from iron chloride (which may be generated as a by-product of the direct chlorination of titaniferous ores) comprises the steps of converting ferrous chloride to ferric chloride by reaction with chlorine, separating the solids from the gaseous products, reacting the gaseous ferric chloride with oxygen, condensing unreacted ferric chloride onto iron oxide particles, separating the gaseous products from the iron oxide particles and recycling the iron oxide particles to the oxidation or condensation step.

15 Claims, 1 Drawing Sheet

TREATMENT OF IRON CHLORIDE FROM CHLORINATION DUST

Figure 1:
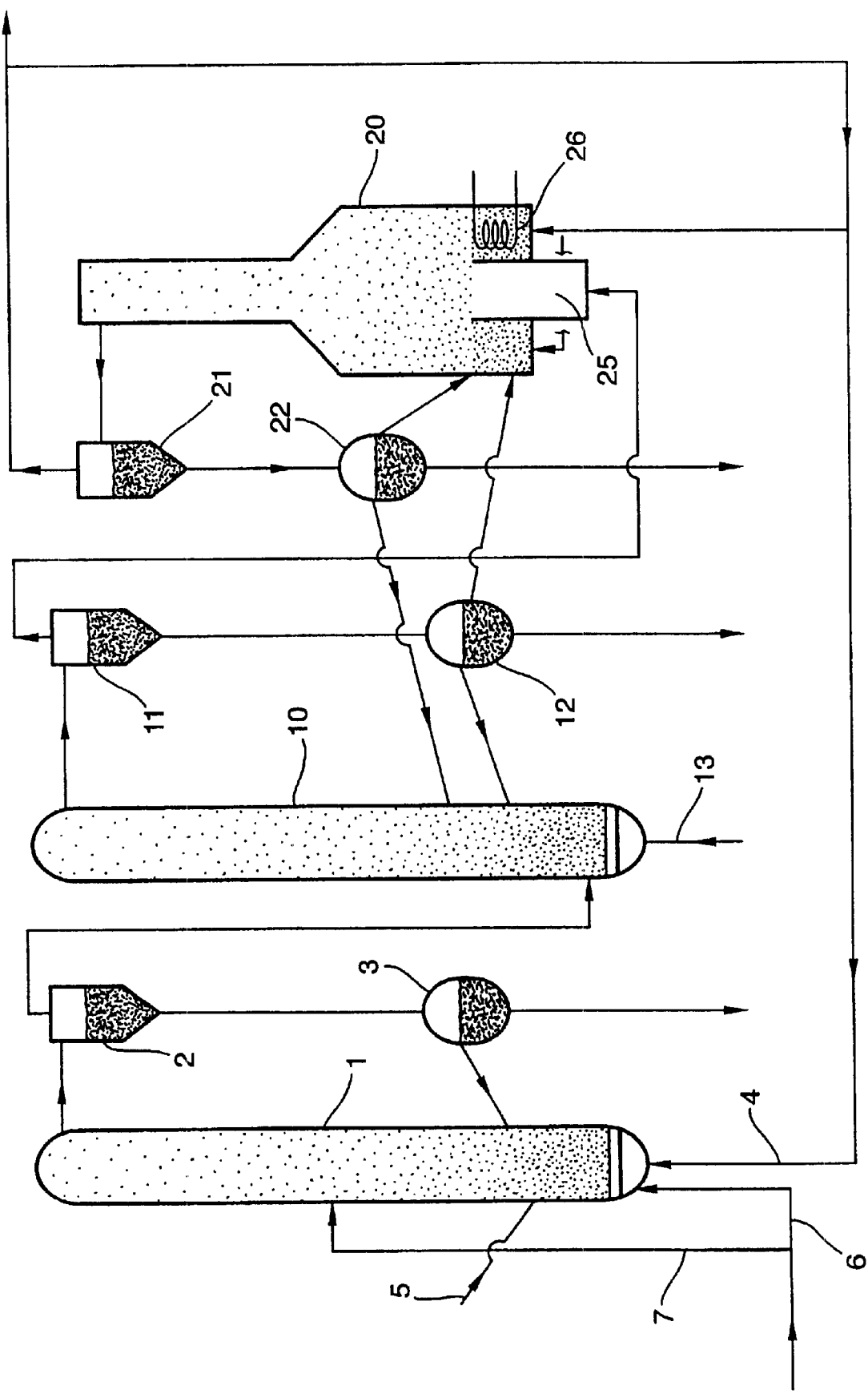

This invention relates to a process for producing chlorine and metal oxides from metal chlorides.

Whilst the process applies to any metal chloride which is oxidisable to chlorine and the corresponding metal oxide, it is particularly applicable to iron chloride.

Several industrial processes, such as the production of titanium dioxide from titanium tetrachloride resulting from the direct chlorination of titaniferous ores, generate large quantities of by-product iron chloride. Disposal of this iron chloride poses potential environmental problems and represents an economic loss of the chlorine.

Depending on the chlorination process, the iron chloride may be present as ferrous chloride, ferric chloride or a mixture of the two.

There have been many attempts to produce an economic process to overcome this problem and these are well summarised in U.S. Pat. No. 4,994,255.

A common step in these processes is the reaction of ferric chloride in the vapour phase with oxygen, i.e.

$$2FeCl_3 + 1.5O_2 \rightarrow Fe_2O_3 + 3Cl_2$$

At low temperature (600° C.) where the thermodynamics of this reaction are favourable, the rate is slow and a catalyst is needed and at higher temperatures (800° C.–900° C.) where the rate is practical, the thermodynamics are unfavourable and the reaction is far from complete.

As a result, particularly when operating at such higher temperatures, the gaseous reaction products contain a relatively high proportion of ferric chloride which needs to be separated from the chlorine.

GB-A-2019376 describes a way of achieving this separation by cooling the gaseous product to cause the ferric chloride to condense out onto iron oxide particles. However, in the arrangement shown, there will be a tendency for the ferric chloride to deposit on the cooling coils in the condenser vessel.

A further problem of the reaction is that there is a tendency for the iron oxide to build-up on the reactor walls and associated equipment.

According to one aspect of the invention, there is provided a process for producing chlorine and iron oxide comprising treating ferric chloride in the vapour phase with oxygen at a temperature of 700 to 900° C. in a fluidised bed reactor, continuously recirculating a portion of the bed material from the reactor back to the reactor, condensing unreacted ferric chloride in the gas stream by cooling iron oxide particles below the condensation point of ferric chloride and injecting said particles into the gas stream whereby ferric chloride condenses on the surface of the iron oxide particles and the particles are carried by the gas stream to a separator, the separated coated iron oxide particles being recycled to the condensation step or the reaction step.

The problem of unwanted ferric chloride deposition is avoided because the ferric chloride does not come into contact with the cooling coils as it does in GB 2019376. Thus a greater amount of unreacted ferric chloride (and hence a lower percentage conversion) can be tolerated. The process can, therefore, be operated at a higher temperature where the kinetics are more favourable and a catalyst is not necessary.

The condensing step is preferably carried out in a fluidised bed condenser as described in EP-A-467441 U.S. Pat. No. 5,205,350).

According to a preferred feature of this invention, the ratio between the recirculation rate of solid material and the feed rate of ferric chloride is at least 10:1. This high ratio provides a scrubbing action which prevents oxide build-up on the equipment.

The chlorination processes previously mentioned are conventionally carried out in a fluidised bed made up of the ore and carbon in the form of coke.

The gaseous products from the process (at 700–1100° C.), in the case of a titanium ore such as ilmenite, consist mainly of titanium tetrachloride and iron chloride. The iron chloride may be in the ferrous and/or ferric form, the amount of each present being dependent on the conditions in the chlorination reaction. In addition, finely divided solids, mainly carbon and unreacted titanium dioxide, are elutriated from the fluidised bed and carried in the gas stream. Thus after appropriate separation of the titanium tetrachloride, a residue, herein referred to as chlorination dust, is left consisting typically of circa 70% iron chloride, 20% carbon, and 5% titanium dioxide, the remainder being small amounts of various chlorides and oxides of other metals such as aluminum, magnesium, manganese etc.

Great difficulties are associated with oxidising chlorination dust. To oxidise ferrous chloride in the vapour phase, high temperatures have to be used because of its low volatility and, hence, large amounts of energy have to be added.

The problems are intensified by the elutriated material. The separation of these impurities from the iron chloride is impracticable before the oxidation step and the resultant iron oxide is contaminated.

Moreover, the carbon will react with added oxygen in preference to the oxidation of iron chloride producing an excessive amount of carbon dioxide which dilutes the recovered chlorine to an extent that it is unsuitable for further use without an expensive separation step. Furthermore the energy released provides difficulties in the downstream process and is costly to remove.

The problems due to the presence of carbon and the other impurities will be relevant even if the iron chloride is present in the ferric form.

The problem of the carbon is ignored in many of the prior art processes. In EP-A-165543 the carbon content of the dust is controlled relative to the amount of iron chloride and in U.S. Pat. No. 4,994,255, the carbon is removed in a separate step.

An attempt to solve the problems is, however, made in GB-A-1517264. In the disclosed process ferrous chloride is reacted with sufficient oxygen to form ferric oxide and ferric chloride but insufficient to liberate any substantial amount of chlorine, the gaseous products, after separation of solid material, being treated to the conventional oxidation process.

Although this reference mentions the problem of excess carbon dioxide, it does not solve this problem as the final gas product contains nearly equal amounts of chlorine and carbon dioxide.

According to a further aspect of the present invention, there is provided a process for treating chloination dust comprising reacting the dust with chlorine in a recirculating fluidised bed to convert ferrous chloride to ferric chloride, separating the solids from the gaseous products, and passing the gaseous product to an oxidation reactor to oxidise the ferric chloride to chlorine and iron oxide.

By operating in this manner, a final gaseous product containing only circa 22% carbon dioxide can be achieved.

The residual solids containing the major amount of the carbon and the unreacted titanium dioxide can be returned for further treatment in the chlorination process.

According to a preferred feature, the temperature necessary for the reaction is achieved by burning a minor proportion of the carbon in the dust.

According to a third aspect of the invention, there is provided a process for producing chlorine and iron oxide from material containing ferrous chloride comprising reacting the material with chlorine in a recirculating fluidised bed to convert the ferrous chloride to ferric chloride, separating the gaseous ferric chloride from any residual solids, reacting the gaseous ferric chloride with oxygen at a temperature of circa 700 to 900° C. in a fluidised bed reactor, continuously recirculating a portion of the bed material from the reactor back to the reactor, condensing unreacted ferric chloride in the gas stream by cooling iron oxide particles below the condensation point of ferric chloride, and injecting said particles into the gas stream whereby ferric chloride condenses on the surface of the iron oxide particles and the particles are carried by the gas stream to a separator, the separated coated iron oxide particles being recycled to the condensation step or the reaction step.

According to a fourth aspect of the invention, there is provided a process for producing chlorine and iron oxide from material containing ferrous chloride comprising reacting the material with chlorine in a recirculating fluidised bed to convert the ferrous chloride to ferric chloride, separating the gaseous ferric chloride from any residual solids, condensing the ferric chloride by injecting iron oxide particles at a temperature below the condensation point of ferric chloride into the gas stream whereby ferric chloride condenses on the surface of the iron oxide particles, reacting the condensed ferric chloride with oxygen at a temperature of 700 to 900° C. in a fluidised bed reactor, continuously recirculating a portion of the bed material including a portion of the iron oxide particles from the reactor back to the reactor, and passing the remaining iron oxide particles to a separator, the separated iron oxide particles being recycled to the condensation step or the reaction step.

The processes of the invention can be carried out satisfactorily at atmospheric pressure. However, there are advantages in carrying out the processes at higher pressures, for example 2–5 bar above atmospheric. For example, the volume of gaseous products produced will be reduced and hence the reaction vessels can be smaller. A further advantage is that less pumping effort will be required to transport the final chlorine product either to storage or for process recycling, particularly where the chlorine is recycled to the ore chlorination process which normally operates under pressure.

Suitable equipment for carrying out the process of this invention is shown in the accompanying drawing.

As shown, the equipment is made up of a first stage consisting of reactor vessel 1, a cyclone separator 2, and solids storage vessel 3, a second stage consisting of a reactor vessel 10, a cyclone separator 11 and a solids storage vessel 12 and a third stage consisting of a condenser vessel 20, a cyclone separator 21 and a solids storage vessel 22.

Chlorine through line 4 and dust through line 5 enter vessel 1 where they mix to form a fluidised bed. The temperature within the vessel is maintained at circa 600° C. either through external heating or by admitting a suitable amount of oxygen through lines 6 and 7 to cause partial burning of the coke in the dust.

The main reactions taking place in vessel 1 are $$2FeCl_2 + Cl_2 \rightarrow 2FeCl_3$$

[Some of the other oxides in the dirt are also chlorinated by a similar reaction]

$$2C + 1.5O_2 \rightarrow CO + CO_2$$

$$CO + 1/2O_2 \rightarrow CO_2$$

The solid and vapour products pass to the cyclone 2. The solid products pass to the storage vessel 3 from which they are recirculated to the fluidised bed in vessel 1 or are removed.

The vapour products pass to the second reactor vessel 10 which is loaded at start-up with iron oxide particles, where they are mixed with oxygen admitted through line 13 to form a fluidised bed at a temperature of circa 800° C.

The main reaction taking place in vessel 10 is $$2FeCl_3 + 1.5O_2 \rightarrow Fe_2O_3 + 3Cl_2$$

The solid and gaseous products pass to cyclone 11. The solid products pass to the storage vessel 12 from which they are recirculated to the fluidised bed in vessel 10, go to vessel 20 or are removed.

The vapour products pass to the condenser vessel 20 (described in more detail below) containing iron oxide particles where they are cooled to a temperature in the range 100–250° C. so that the residual ferric chloride is deposited on to the iron oxide particles.

The solid and gaseous products pass to the cyclone 21. The solid particles pass to the storage vessel 22 from which they are recirculated to the fluidised beds in vessels 10 and 20 or are removed.

The gaseous product consisting of chlorine, carbon dioxide and oxygen is recirculated back to vessels 1 and 20 and/or is recirculated back to the ore chlorinator.

As mentioned above, the condenser vessel 20 contains iron oxide particles. Chlorine is passed into the base of the vessel at a suitable rate so as to fluidise the particles sufficiently for them to overflow a gas inlet 25 through which the vapour products from the cyclone 11 enter vessel 20. The vapour products and the iron oxide form a recirculating fluidised bed at circa 150° C., this temperature being maintained by means of cooling coils 26 at the base of the vessel 20, so that ferric chloride condenses on to the iron oxide particles. By positioning the cooling coils 26 below the gas inlet 25, condensation of ferric chloride on the cooling coils is prevented. The condenser is described in more detail in EP-A-467441.

In an alternative arrangement, the condenser vessel 20 may be inserted between the first and second reactor vessel 1 and 10 such that the ferric chloride is deposited on the iron oxide particle and is then oxidised to iron oxide and chlorine. The result is a build-up of iron oxide layers leading to larger particles which are more easily handled.

The invention is illustrated by the following example.

EXAMPLE

The reactor system was pre-heated by feeding oxygen at circa 500° C. into vessel 1.

Dirt from an ore chlorinator comprising 75% ferrous chloride, 13% carbon, 5% titanium dioxide and 7% other chlorides (mainly aluminium and magnesium) and oxides was admitted with chlorine into vessel 1 to form a fluidised bed. The flow of unheated oxygen was adjusted to provide sufficient burning of the carbon to give a steady state reaction temperature in vessel 1 of circa 600° C.

The vapour product produced comprised 81% ferric chloride, 11% carbon dioxide, 3% carbon monoxide, 3% aluminium chloride and 2% other chlorides. The solid product comprised 55% carbon, 26% titanium dioxide, 10% magnesium chloride and 9% other chlorides and oxides.

The steady state temperature in vessel 10 was circa 800° C. due to the exothermic nature of the reaction taking place.

The vapour product from vessel 10 comprised 59% chlorine, 19% ferric chloride, 17% carbon dioxide, 4% zirconium chloride and 1% oxygen. The solid product comprised 96% iron oxide, 3% aluminium oxide and 1% oxides of niobium, phosphorus and magnesium.

The steady state temperature of the condenser vessel 20 was 150° C.

The vapour product from vessel 21 comprised 76% chlorine, 22% carbon dioxide, 2% oxygen and a minor amount of hydrogen chloride. The solid product from vessel 22 comprised 48% iron oxide, 41% ferric chloride, 8% zirconium chloride and 3% of other minor compounds.

What is claimed is:

1. In a process for producing chlorine and iron oxide comprising treating ferric chloride in the vapour phase with oxygen at a temperature of 700 to 900° C. in a fluidised bed rector to produce a gas stream Product comprising chlorine, unreacted ferric chloride, the improvements are: continuously recirculating a portion of the bed material from the reactor back to the reactor, condensing the unreacted ferric chloride in the gas stream product by cooling iron oxide particles below the condensation point of ferric chloride and injecting said particles into the gas stream product whereby ferric chloride condenses on the surface of the iron oxide particles and the particles are carried by the gas stream product to a separator, the separated coated iron oxide particles being recycled to the condensation step or the treating step.

2. A process for producing chlorine and iron oxide from material containing ferrous chloride comprising reacting the material with chlorine in a recirculating fluidised bed to convert the ferrous chloride to ferric chloride, separating the gaseous ferric chloride from any residual solids, treating the gaseous ferric chloride with oxygen at a temperature of about 800° C. in a fluidised bed reactor to produce iron oxide and a gas stream product comprising chlorine and unreacted ferric chloride, continuously recirculating a portion of the bed material from the reactor back to the reactor, condensing the unreacted ferric chloride in the gas stream product by cooling iron oxide particles below the condensation point of ferric chloride and injecting said particles into the gas stream product whereby ferric chloride condenses on the surface of the iron oxide particles and the particles are carried by the gas stream product to a separator, the separated coated iron oxide particles being recycled to the condensation step or the treating step.

3. A process for producing chlorine and iron oxide from material containing ferrous chloride comprising reacting the material with chlorine in a recirculating fluidised bed to convert the ferrous chloride to ferric chloride, separating the gaseous ferric chloride from any residual solids, condensing the ferric chloride by injecting iron oxide particles at a temperature below the condensation point of ferric chloride into the gaseous ferric chloride whereby ferric chloride condenses on the surface of the iron oxide particles, treating the condensed ferric chloride with oxygen at a temperature of 700 to 900° C. in a fluidised bed reactor to produce iron oxide and a gaseous product comprising chlorine, continuously recirculating a portion of the bed material including a portion of the iron oxide particles from the reactor back to the reactor, and passing the remaining iron oxide particles to a separator, the separated iron oxide particles being recycled to the condensation step or the treating step.

4. A process according to claim 1 in which the ratio between the recirculation rate of solid material and the feed rate of ferric chloride to the reactor is at least 10:1.

5. A process according to claim 1 in which the condensation step is carried out in a fluidised bed condenser.

6. A process according to claim 1 which is carried out at above atmospheric pressure.

7. A process according to claim 2 in which the ratio between the recirculation rate of solid material and the feed rate of ferric chloride to the reactor is at least 10:1.

8. A process according to claim 2 in which the condensation step is carried out in a fluidised bed condenser.

9. A process according to claim 3 in which the condensation step is carried out in a fluidised bed condenser.

10. A process according to claim 2 in which the conversion step is carried out at a temperature of 550 to 700° C.

11. A process according to claim 3 in which the conversion step is carried out at a temperature of 550 to 700° C.

12. A process according to claim 2 in which the heat necessary to achieve the temperature of the conversion step is generated by burning a proportion of the carbon in the dust.

13. A process according to claim 3 in which the heat necessary to achieve the temperature of the conversion step is generated by burning a proportion of the carbon in the dust.

14. A process according to claim 2 which is carried out at above atmospheric pressure.

15. A process according to claim 3 which is carried out at above atmospheric pressure.

* * * * *